United States Patent
Connolly et al.

(10) Patent No.: US 7,571,377 B2
(45) Date of Patent: Aug. 4, 2009

(54) METHOD AND APPARATUS FOR TRANSMITTING DATA IN AN INTEGRATED CIRCUIT

(75) Inventors: Brian John Connolly, Williston, VT (US); Todd Edwin Leonard, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 11/275,303

(22) Filed: Dec. 22, 2005

(65) Prior Publication Data

US 2006/0092980 A1    May 4, 2006
US 2007/0147430 A1    Jun. 28, 2007

(51) Int. Cl.
*G06F 11/10* (2006.01)
(52) U.S. Cl. .................................. 714/807

(58) Field of Classification Search ............... 714/746, 714/776, 800–801, 807
See application file for complete search history.

(56) References Cited

U.S. PATENT DOCUMENTS 6,279,140 B1 * 8/2001 Slane .................... 714/807
7,210,056 B2 * 4/2007 Sandven et al. ........ 713/600
7,463,649 B2 * 12/2008 Hsu ....................... 370/474

* cited by examiner

*Primary Examiner*—Shelly A Chase
(74) *Attorney, Agent, or Firm*—W. Riyon Harding

(57) ABSTRACT

A method and apparatus for transmitting data packets in an integrated circuit according to a data integrity scheme that embeds an integrity value in each data packet. As the data packets are transferred, the data integrity value for a data packet is stored during a stall of the transmission of that data packet so that the stored integrity value can be used after the stall has ceased.

22 Claims, 4 Drawing Sheets

300

| Start Of Packet (SOP) | Payload | CRC | VCRC | VCRC | End Of Packet (EOP) |

| Start Of Packet (SOP) | Payload | VCRC | VCRC | End Of Packet (EOP) |

*Figure 4*

METHOD AND APPARATUS FOR TRANSMITTING DATA IN AN INTEGRATED CIRCUIT

BACKGROUND

1. Technical Field of the Present Invention

The present invention generally relates to integrated circuits and, more specifically, to the transmission of data in an integrated circuit.

2. Description of Related Art

In the past, communication of data at high speeds between various elements of a system was limited to a relatively few number of applications. Today, however, high-speed communication has become a requirement for most applications. High-speed communication is typically accomplished by breaking the data into packets that can be transmitted (via a transmitter) and re-assembled (via a receiver) at the destination. The integrity of the data packets is ensured using data error/correction techniques such as Cyclic Redundancy Coding (CRC) and Variant CRC (VCRC). The CRC and VCRC are part of the data packet and are calculated with each transmission.

Typical vendor design solutions provide a transmitter/receiver package that implements the high-speed data packet communication between two distinct portions of a customer design according to a particular protocol such as Infiniband™.

The transmission mediums used in the package solution and the customer designs are not always of equal capacity. Consequently, the transmission of the data packets can be stalled by certain conditions such as the transmitter being filled to capacity or as a result of transmitting the data packet across differing clock domains.

Current designs of the transmitter/receiver package rely on each customer creating an individualized solution for resolving stalls. Unfortunately, this results in numerous differing solutions for the same problem; many of which are incompatible with one another.

It would, therefore, be a distinct advantage to have a method and apparatus that would resolve theses transmission stalls in the transmitter/receiver package so as to provide a consistent and less error prone solution with multiple differing customer interfaces.

SUMMARY OF THE PRESENT INVENTION

In one aspect, the present invention is a method of transmitting data packets using a protocol that verifies the integrity of the data packet with an integrity value residing in the data packet. The method includes the steps of receiving a data packet (the data packet can have a predetermined length), and receiving an indication that a transmission of the data packet has been interrupted prior to receiving the entire data packet. The method also includes the step of saving, in response to the interruption indication, the integrity value of the data packet. The method further includes the steps of receiving an end of packet indicator in the data packet, and inserting, in response to receiving the end of packet indicator, the saved integrity value into the transmission of the data packet.

The method can include the step of generating the integrity value for the data packet as it is received. The method can further include the step of formatting the received data packet to match a specified transmission length. In addition, the method can include the step of adding, in response to the interruption indication, a wait cycle to the transmission of the data packet.

A transmission medium that is used for transmitting the data packet can be smaller than the size of the received data packet. In that case, the step of formatting includes splitting the transmission of the data packet into a first portion that gets transmitted first and a second portion that gets transmitted second.

Transmitting the data packet to a clock domain that differs from the destination clock domain can cause the interruption of the transmission of the data packet.

BRIEF DESCRIPTION OF THE DRAWINGS

The present invention will be better understood and its advantages will become more apparent to those skilled in the art by reference to the following drawings, in conjunction with the accompanying specification, in which:

FIG. 3 is a diagram of a data packet that can be transmitted by the customer interface of FIG. 2 according to the teachings of the present invention;

FIG. 4 is a diagram of a data packet that can be transmitted by the pipeline stage of the transmitter of FIG. 2 according to the teachings of the present invention.

DETAILED DESCRIPTION OF THE PREFERRED EMBODIMENT OF THE PRESENT INVENTION

The present invention is a method and apparatus for transmitting data using a packet-based protocol that supports VCRC data integrity. During the transmission of the data packet, a pause can occur from crossing one clock domain to another or for other similar reasons. The present invention resolves these pauses by adding a wait cycle to the transmission and saving the calculated VCRC value at the point the pause is detected. Once the end of the data packet has been received, the saved VCRC value is inserted into the data packet and transmitted.

Figure 1:
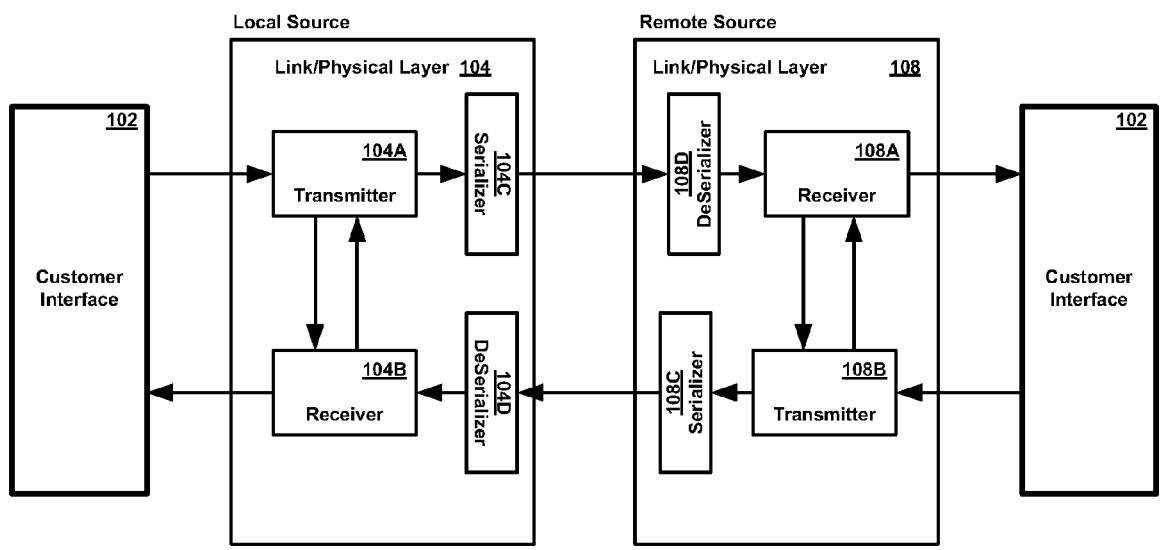
FIG. 1 is drawing illustrating a communication core that can be incorporated into an integrated circuit and demonstrates how data is transferred from a local source to a remote source using a packet-based protocol according to the teachings of the present invention.

Reference now being made to FIG. 1, a communication core 100 that can be incorporated into an integrated circuit is shown to demonstrate how data is transferred from a local source to a remote source using a packet-based protocol according to the teachings of the present invention. In the preferred embodiment of the present invention, the packet-based protocol is the Infiniband™ architecture.

Communication core 100 includes local and remote communication sources each having a customer interface (102 and 106) and a link/physical layer (104 and 108). The Link/Physical layers 108 and 104 include the following identical elements: transmitter (104A and 108A), a receiver (104B and 108B), a serializer (104C and 108C), and deserializer (104D and 108D). The discussion below concerning the Link/Physical layer 108 is equally applicable to the equivalent elements of Link/Physical layer 104.

The customer interface 106 includes pins and the like for providing access to the remote source. In the preferred embodiment of the present invention, the customer interface 106 provides data in packets using Cyclic Redundancy Coding (CRC) for data integrity.

The receiver 108A receives data packets from the transmitter 104B and transmits them to the customer interface 106 using CRC.

The transmitter 108B receives data from the customer interface 106 and encodes the data packets using the CRC and transmits them to the serializer 108c using Variant Cyclic Redundancy Coding (VCRC) for data integrity. The serializer 108C serializes the packet data onto the available Wire/Cable 112 according to its configuration width in bytes of one (1), four (4), eight (8), and twelve (12) and in a speed of either Single Data Rate (SDR) or Double Data Rate (DDR).

The deserializer 108D receives data packet in the VCRC format on the Wire/Cable 110 and decodes the data packet and provides it to the receiver 108A.

Transmitter 108B transmits the data packet while resolving pauses in the receipt of the packet data by the local source as described in connection with FIG. 2 below.

Figure 2:
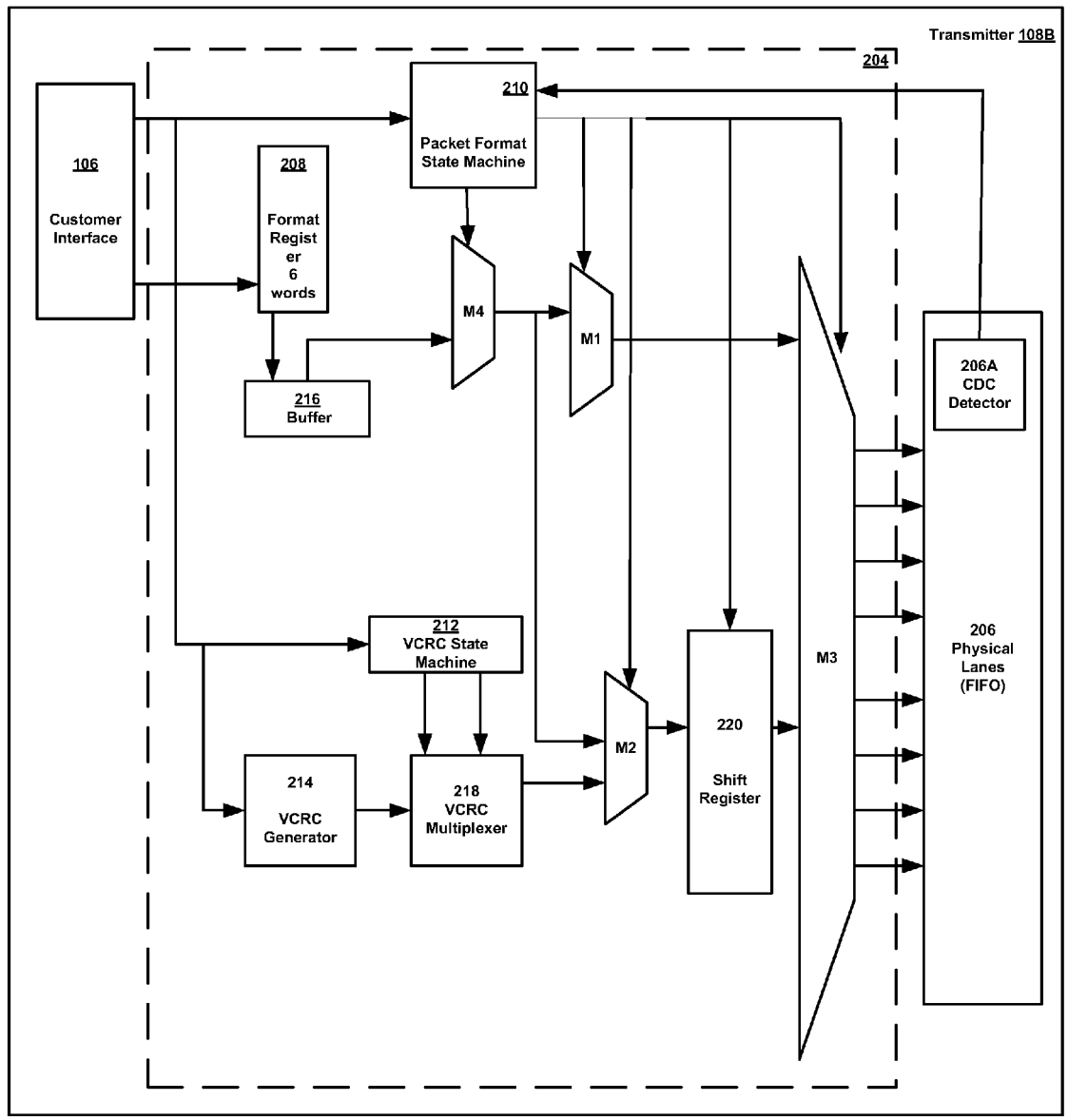
FIG. 2 is a circuit diagram illustrating in greater detail the transmitter of FIG. 1 according to the teachings of the present invention.

Reference now being made to FIG. 2, a circuit diagram is shown illustrating in greater detail the transmitter 108B of FIG. 1 according to the teachings of the present invention. The transmitter 108B includes a pipeline stage 204 and a physical lane/FIFO 206.

In a packet-based protocol, data is received in packets having a predefined length (e.g., 1 byte). In the preferred embodiment of the present invention, a data packet transmitted by the customer interface 106 can resemble the data packet 300 shown in FIG. 3. Data packet 300 has a Start Of Packet indicator, a payload (data which can include several bytes), a CRC value, a VCRC (two bytes) value, and an End Of Packet (EOP) indicator.

In the preferred embodiment of the present invention, data packets received from the customer interface 106 by the pipeline stage 204 are formatted to comply with a Variant Cyclic Redundancy Coding (VCRC) data integrity and to comply the configuration of the physical lane 206. A VCRC data packet can resemble the VCRC data packet 400 shown in FIG. 4.

In the preferred embodiment of the present invention, the physical lanes 206 are dynamically configurable to support the transmission of one (1), four (4), eight (8), and twelve (12) bytes of data each clock cycle at either Single Data Rate (SDR) or Double Data Rate (DDR) speeds. Depending upon the configured width of the physical lanes 206, speed of transfer (i.e., SDR or DDR) and the length of the data packet received by the customer interface 106, the received data packet will be completely transmitted in one to three clock cycles. Physical lanes 206 includes a Clock Domain Crossing (CDC) detector 206A which can detect pauses generated during the transmission of the data packet from the physical lanes 206 (e.g., filled to capacity or crossing clock domains).

The customer interface 106 transmits data packets in 192 bit increments (i.e., 6 words) to a format register 208 and a VCRC generator 214.

The format register 208 is responsible for formatting the received data packets into new data packets that are consistent with the data width supported by the physical lanes 206. Depending upon the data packet width, the format register 208 can store a portion of the received packets in the buffer 216. The newly formatted data packets are then sent to multiplexer M4 from the format register 208 or buffer 216.

Packet format state machine 210 directs multiplexers M1-M4 where to send the data packet and the shift register 220 when to send a portion of the data packet to multiplexer M3. If the current configuration of physical lanes 206 and data transfer speed can accomplish the transfer of the configured data packet in a single cycle, then packet format state machine 210 directs multiplexer M4 to transmit the data packet in its entirety to multiplexer M1; otherwise, packet format state machine 210 directs multiplexer M4 to split the packet data into lower and upper portions and transmit to multiplexer M1 and M2, respectively.

The packet format state machine 210 directs multiplexer M1 to place any received packet data in multiplexer M3. If the packet data was split into lower and upper portions then packet format state machine 210 directs multiplexer M2 to transfer the upper portion to shift register 220.

Packet state machine 210 directs multiplexer M3 to transmit the received data packet to the physical lanes 206. If the data packet has been broken into multiple portions, then after multiplexer M3 has completed its transfer, packet state machine 210 directs shift register 220 to transfer the remaining portion of the data packet to multiplexer M3, and multiplexer M3 to transfer the portion of the data packet to the physical lanes 206.

The VCRC generator 214 generates a VCRC value using well-known and understood techniques for the received data packet. The generated VCRC value is provided to the VCRC multiplexer 218.

VCRC multiplexer 218 includes a set of latches (not shown) that store the VCRC value upon receiving a hold signal from the VCRC state machine 212. The VCRC multiplexer 218 provides the VCRC value to either multiplexer M2 or M1 depending upon the stage of transfer for the data packet (current clock cycle and completion) and whether the packet data has been split into upper and lower portions.

If the packet data is fully contained in multiplexer M1 then VCRC multiplexer 218 transfers the VCRC value to multiplexer M1 for insertion into the data packet. If the data packet is split into upper and lower portions then VCRC multiplexer 218 transfers the VCRC value to multiplexer M2 for insertion into the data packet.

Figure 5:
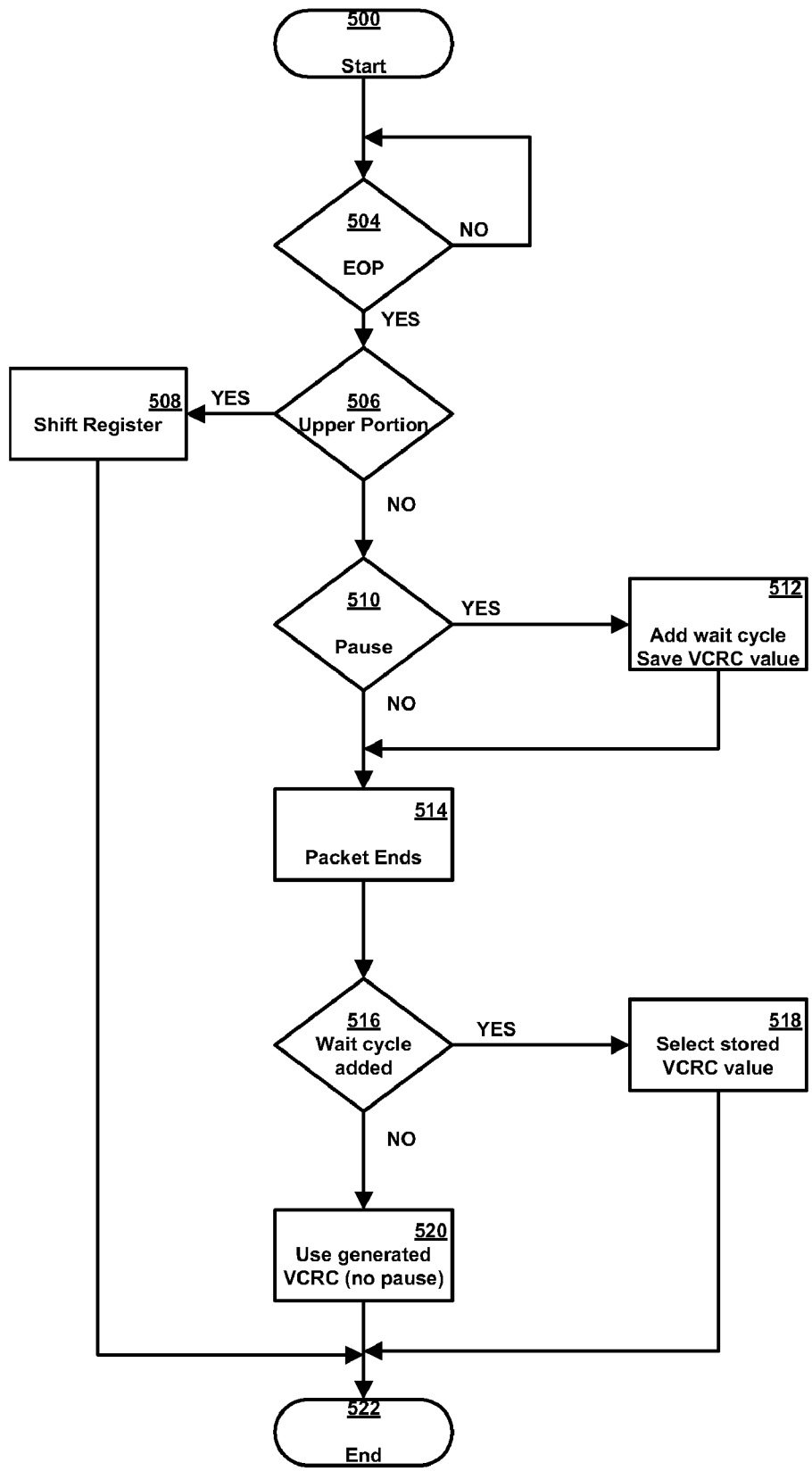
FIG. 5 is a flow chart illustrating a method of processing pauses (stalls) that are generated during the receipt of packet data by the FIFO of FIG. 2 according to the teachings of the present invention.

Reference now being made to FIG. 5, a flow chart is shown illustrating a method of processing pauses (stalls) that are generated during the receipt of packet data by the FIFO 206 of FIG. 2 according to the teachings of the present invention. In the preferred embodiment of the present invention, data packets are received from the customer interface 106 in a CRC packet-based protocol (Step 500).

The VCRC state machine 212 monitors the receipt of the data packets and control signals for an EOP indicator (Step 504). Upon the detection of an EOP indicator, the VCRC state machine 212 determines whether the data packet has been split between multiplexers M1 and M2 (Step 506). If the data packet has been split, then the VCRC state machine 212 directs the VCRC multiplexer 218 to transmit the VCRC value to the multiplexer M2 (Step 508), and the VCRC value is added to the packet data by multiplexer M2 and the transmission of the data packet proceeds as previously described in connection with FIG. 2 (Step 522).

If, however, the data packet has not been split, then the VCRC state machine 212 monitors the CDC detector 206A to determine whether a pause (stall) in the transmission of packet data by the physical lanes 206 has occurred (Step 510).

If a pause occurs, then a wait cycle is added to the processing of the transmission of the current data packet and the VCRC state machine 212 instructs the VCRC multiplexer 218 to hold the generated VCRC value via a hold signal (Step 512).

After the packet ends, which can occur in 1 to 3 clock cycles as previously explained in connection with FIG. 2, the VCRC state machine 212 determines whether a wait cycle was added as a result of a pause condition (Steps 514-516).

If a wait cycle was added, then the VCRC state machine 212 instructs the VCRC multiplexer 218 to use the held VCRC value; otherwise it instructs the multiplexer 218 to use the generated VCRC value (Steps 516-520). Thereafter, multiplexer 218 transmits the VCRC value to either multiplexer M1 or M2 as previously discussed in connection with FIG. 2 (Step 522).

Table 1 below represents an example of how the data packet can appear if the physical lanes 206 were configured for 12 bytes (L0-L11 representing one lane transmitting a single byte serially) and each row represents one clock cycle.

TABLE 1

| row | L0 | L1 | L2 | L3 | L4 | L5 | L6 | L7 | L8 | L9 | L10 | L11 |
|-----|-----|------|------|------|------|------|------|------|------|------|------|------|
| 1 | SDP | Data | Data | Data | Data | Data | Data | Data | Data | VCRC | VCRC | EGP |
| 2 | SDP | Data | Data | Data | Data | Data | Data | Data | Data | Data | Data | Data |
| 3 | Data | Data | Data | Data | Data | Data | Data | Data | Data | VCRC | VCRC | EGP |
| 4 | SDP | Data | Data | Data | Data | VCRC | VCRC | EGP | Pad | Pad | Pad | Pad |

Row one represents a 12 byte packet being sent in a single clock cycle. Rows 2 and 3 represents a 24 byte data packet being sent in two clock cycles. Row four represents a four byte data packet being sent in a single clock cycle.

Table 2 below represents the same transmission of the data packet as explained in Table 1 above, except a pause occurs during the transmission on clock cycle 1. In this case, the same 12 byte data packet is sent on the second clock cycle after the pause has ceased.

| row | L0 | L1 | L2 | L3 | L4 | L5 | L6 | L7 | L8 | L9 | L10 | L11 |
|-----|-----|------|------|------|------|------|------|------|------|------|------|------|
| 1 | SDP | Data | Data | Data | Data | Data | Data | Data | Data | VCRC | VCRC | EGP |
| PAUSE | | | | | | | | | | | | |
| 2 REPEAT SAME DATA | SDP | Data | Data | Data | Data | Data | Data | Data | Data | VCRC | VCRC | EGP |
| 3 | Data | Data | Data | Data | Data | Data | Data | Data | Data | VCRC | VCRC | EGP |
| 4 | SDP | Data | Data | Data | Data | VCRC | VCRC | EGP | Pad | Pad | Pad | Pad |

It is thus believed that the operation and construction of the present invention will be apparent from the foregoing description. While the method and system shown and described has been characterized as being preferred, it will be readily apparent that various changes and/or modifications could be made without departing from the spirit and scope of the present invention as defined in the following claims.

What is claimed is:

1. A method of transmitting data packets using a protocol that verifies the integrity of the data packet with an integrity value residing in the data packet, the method comprising the steps of:
   receiving a data packet;
   receiving an indication that a transmission of the data packet has been interrupted prior to receiving the entire data packet;
   saving, in response to the interruption indication, the integrity value of the data packet;
   receiving an end of packet indicator in the data packet; and
   inserting, in response to receiving the end of packet indicator, the saved integrity value into the transmission of the data packet.

2. The method of claim 1 wherein the data packet has a predetermined length.

3. The method of claim 2 further comprising the step of:
   generating the integrity value for the data packet as it is received.

4. The method of claim 3 further comprising the step of:
   formatting the received data packet to match a specified transmission length.

5. The method of claim 4 further comprising the step of:
   adding, in response to the interruption indication, a wait cycle to the transmission of the data packet.

6. The method of claim 5 wherein the transmission medium used for transmitting the data packet is smaller than the size of the received data packet, and the step of formatting includes the step of:
   splitting the transmission of the data packet into a first portion that gets transmitted first and a second portion that gets transmitted second.

7. The method of claim 6 wherein the interruption of the transmission of the data packet is caused by transmitting from a clock domain that differs from the destination clock domain.

8. A method of transmitting data packets using a protocol that verifies the integrity of the data packet with an integrity value residing in the data packet, the method comprising the steps of:
   receiving a data packet of a predetermined length;
   generating the integrity value for the data packet as it is received;
   formatting the received data packet to match a specified transmission length;
   receiving an indication that a transmission of the data packet has been interrupted prior to receiving the entire data packet;
   saving, in response to the interruption indication, the integrity value of the data packet;
   adding, in response to the interruption indication, a wait cycle to the transmission of the data packet;
   receiving an end of packet indicator in the data packet; and inserting, in response to receiving the end of packet indicator, the saved integrity value into the transmission of the data packet.

9. The method of claim 8 wherein a transmission medium used for transmitting the data packet is smaller than the size of the received data packet, and the step of formatting includes the step of:

splitting the transmission of the data packet into a first portion that gets transmitted first and a second portion that gets transmitted second.

10. The method of claim 9 wherein the step of splitting the transmission of the data packet includes the step of:

storing the second portion into a shift register.

11. The method of claim 10 wherein the interruption of the transmission of the data packet is caused by transmitting clock domain differing from the destination clock domain.

12. An apparatus for transmitting data packets, the apparatus comprising:

circuitry that receives a data packet of a predetermined length;

circuitry that transmits the received data packet;

indication circuitry that generates an interruption indication when the transmission of the received data packet has been interruption prior to receiving the entire data packet;

storing circuitry that stores, in response to the interruption indication, an integrity value for the data packet;

monitoring circuitry that monitors the receipt of the data packet for an end of packet indicator and generates an end of packet notification; and formatting circuitry that, in response to receiving the end of packet notification, the saved integrity value into the transmission of the data packet.

13. The apparatus of claim 12 wherein the data packet has a predetermined length.

14. The apparatus of claim 13 further comprising:

circuitry that generates the integrity value for the data packet as it is received.

15. The apparatus of claim 14 further comprising:

circuitry that formats the received data packet to match a specified transmission length.

16. The apparatus of claim 15 further comprising:

circuitry that adds, in response to the interruption indication, a wait cycle to the transmission of the data packet.

17. The apparatus of claim 16 wherein a transmission medium used for transmitting the data packet is smaller than the size of the received data packet, and the circuitry that formats includes:

circuitry that splits the transmission of the data packet into a first portion that gets transmitted first and a second portion that gets transmitted second.

18. The apparatus of claim 17 wherein the interruption of the transmission of the data packet is caused by transmitting from a clock domain that differs from the destination clock domain.

19. An apparatus for transmitting data packets using a protocol that verifies the integrity of the data packet with an integrity value residing in the data packet, the apparatus comprising:

means for receiving a data packet of a predetermined length;

means for generating the integrity value for the data packet as it is received;

means for formatting the received data packet to match a specified transmission length;

means for receiving an indication that a transmission of the data packet has been interrupted prior to receiving the entire data packet;

means for saving, in response to the interruption indication, the integrity value of the data packet;

means for adding, in response to the interruption indication, a wait cycle to the transmission of the data packet;

means for receiving an end of packet indicator in the data packet; and means for inserting, in response to receiving the end of packet indicator, the saved integrity value into the transmission of the data packet.

20. The apparatus of claim 19 wherein a transmission medium used for transmitting the data packet is smaller than the size of the received data packet, and the means for formatting includes:

means for splitting the transmission of the data packet into a first portion that gets transmitted first and a second portion that gets transmitted second.

21. The apparatus of claim 20 wherein the means for splitting the transmission of the data packet includes:

means for storing the second portion into a shift register.

22. The apparatus of claim 21 wherein the interruption of the transmission of the data packet is caused by transmitting from a clock domain that differs from the destination clock domain.

* * * * *